A. JULIEN.
POTATO BUG DESTROYER.
APPLICATION FILED JUNE 10, 1919.

1,320,237.

Patented Oct. 28, 1919.
2 SHEETS—SHEET 1.

Albert Julien INVENTOR.

BY Victor J. Evans ATTORNEY.

A. JULIEN.
POTATO BUG DESTROYER.
APPLICATION FILED JUNE 10, 1919.

1,320,237.

Patented Oct. 28, 1919.
2 SHEETS—SHEET 2.

WITNESS:

Albert Julien INVENTOR.
BY
Victor J. Evans
ATTORNEY.

UNITED STATES PATENT OFFICE.

ALBERT JULIEN, OF STILLWATER, MINNESOTA.

POTATO-BUG DESTROYER.

1,320,237.  Specification of Letters Patent.  Patented Oct. 28, 1919.

Application filed June 10, 1919. Serial No. 303,038.

*To all whom it may concern:*

Be it known that I, ALBERT JULIEN, a citizen of the United States, residing at Stillwater, in the county of Washington and State of Minnesota, have invented new and useful Improvements in Potato-Bug Destroyers, of which the following is a specification.

One of the objects of my present invention is the provision of a potato bug destroyer embodying reels for displacing potato bugs for plants, which reels are highly efficient for the purpose stated, and one of such character that they will inflict no injury what ever on the plants.

Another object of the invention is the provision of a potato bug destroyer embodying novel and highly efficient means for crushing the collected bugs.

Another object is the provision of a potato bug destroyer which, by reason of the construction of the reel-driving mechanism, is simple and inexpensive, and is susceptible of being conveniently handled by the operator, and at the same time is light of draft.

Other objects and practical advantages of the invention will be fully understood from the following description and claims when the same are read in connection with the drawings, accompanying and forming part of this specification in which:

Similar numerals of reference designate corresponding parts in all of the views of the drawings.

Figure 1:
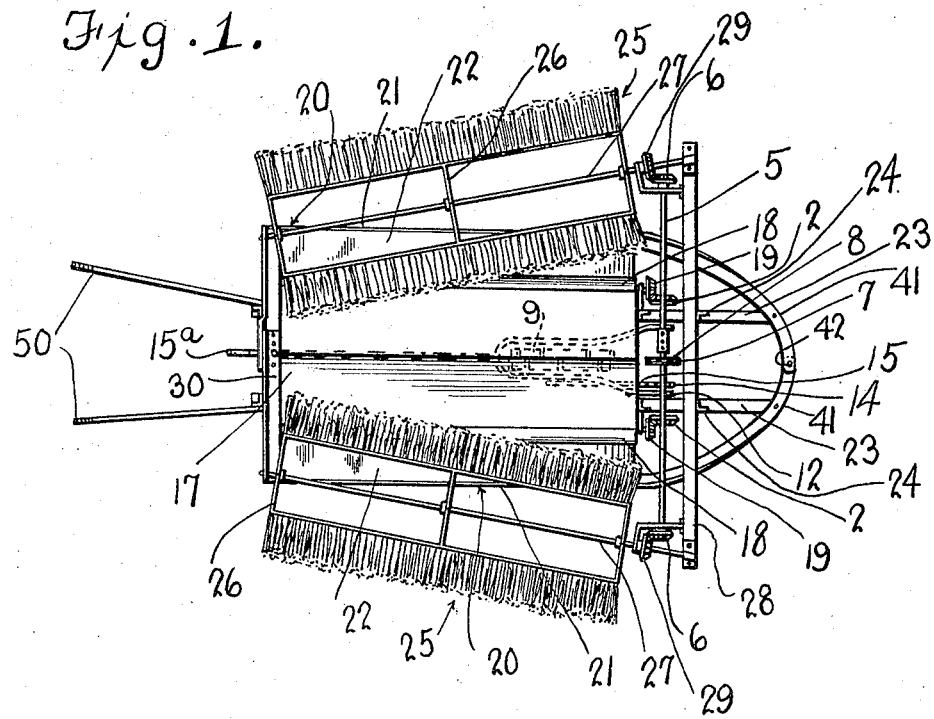
Figure 1 is a plan view of the destroyer constituting the best practical embodiment of my invention that I have as yet devised.
Figure 2:
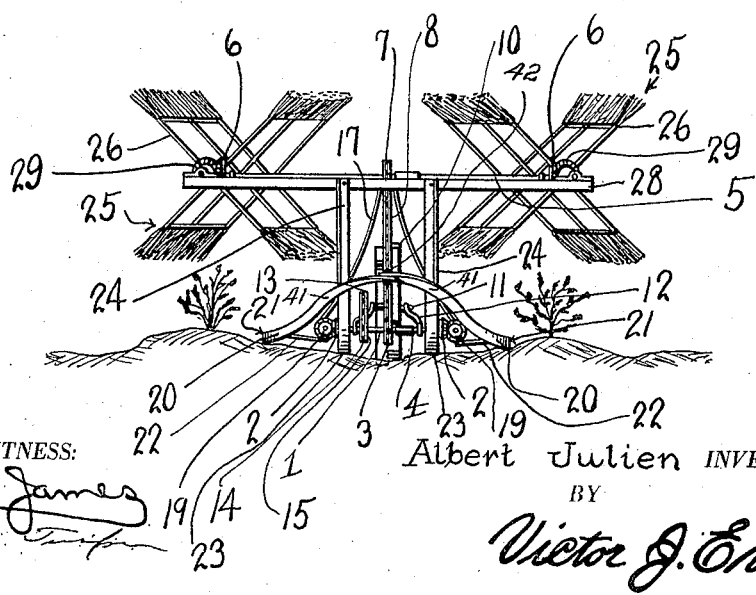
Fig. 2 is a front elevation of the destroyer.
Figure 3:
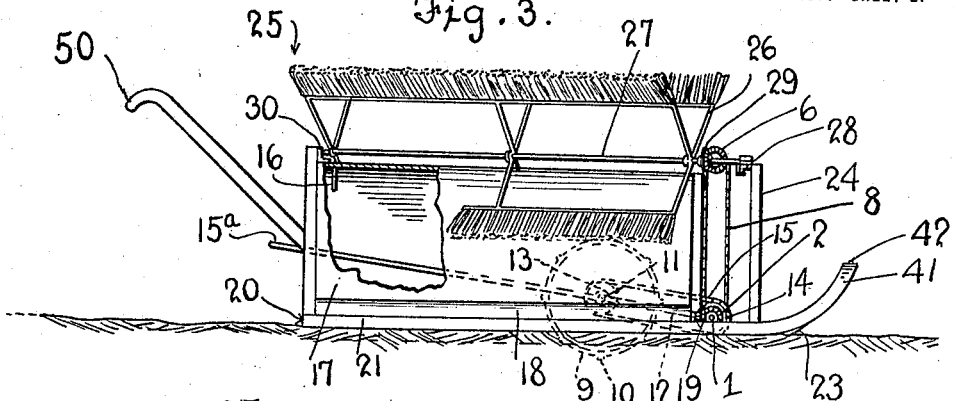
Fig. 3 is a view of the destroyer, partly in side elevation and partly in longitudinal vertical section.
Figure 4:
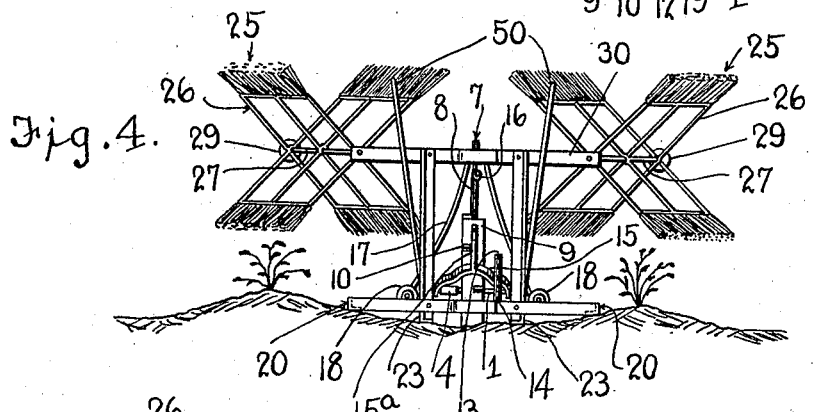
Fig. 4 is a rear elevation of the destroyer.
Figure 5:
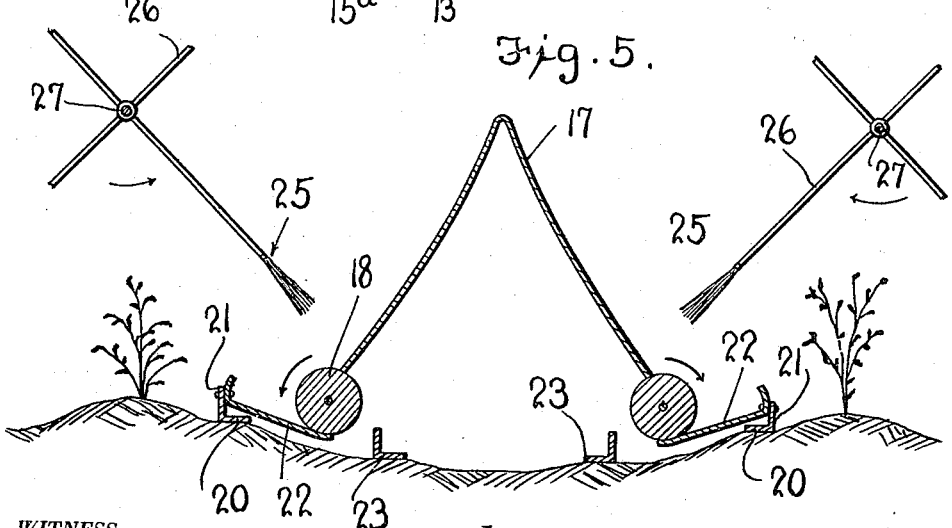
Fig. 5 is an enlarged transverse section, diagrammatic in character, illustrating the relative arrangement of the salient features of my novel destroyer.

Among other elements my improved potato bug destroyer comprises a transverse drive-shaft 1, mounted adjacent to the forward end of the frame of the destroyer and having miter gears 2 at its ends. The said shaft 1 is provided at 3 with a sprocket gear, and at 4 with a sleeve keyed to the shaft sections, whereby the shaft may be increased or diminished in length when the machine is increased or diminished in width. Supported above the shaft 1 is a comparatively long transverse shaft 5 which reaches outwardly beyond the sides of the frame and is equipped at its end with miter gears 6. The sprocket gear 3 on the shaft 1 is connected with a sprocket gear 7 on the shaft 5 through the medium of a sprocket belt 8, so that the shaft 5 is driven from the shaft 1.

At 9 is a longitudinal-central ground wheel having tractive devices 10 on its perimeter. The said ground wheel is fixed to a shaft 11 that is journaled in the tangs of a fork 12 which tangs are mounted on the shaft 1, so as to be capable of vertical swinging movement. Power is transmitted from the ground wheel 9 to the shaft 1 through the medium of a sprocket gear 13 on the shaft 11, a sprocket gear 14 on the shaft 1, and a sprocket belt 15 that is mounted on and connects said gears 13 and 14. The fork 12 is fixed with respect to a rearwardly extending handle 15ª. Manifestly by reason of the mounting of the fork 12, the ground wheel 9 is free to move upwardly and downwardly according to the roughness of the surface traversed by the same, and the handle 15ª is adapted to enable the operator to conveniently control the wheel 9. The said handle 15ª is adapted to be raised and detachably engaged with a keeper 16 with a view to putting the machine out of gear. The said keeper 16 is preferably disposed at the highest part of the deflector 17. This latter is of inverted U-shape in cross-section and extends longitudinally of the machine, and is connected with the frame in the manner illustrated. At opposite sides of the said deflector 17 are longitudinally disposed crushing rolls 18, said rolls being driven from the shaft 1 through the medium of the beforementioned gears 2 which intermesh with complementary gears 19 on the forward trunnions of the rolls. It will be apparent here that when potato bugs are deposited on the sides of the deflector 17, they will be guided downwardly and discharged upon the rolls 18. Disposed at opposite sides of the machine frame are runners 20 designed to bear upon the potato hills during a traverse of the machine between rows, and carried by upstanding portions 21 on the said runners and extending inwardly and downwardly from said upstanding portions are resilient plates 22. These plates 22 are held under yielding pressure against the lower portions of the rolls 18, and consequently the bugs deposited on the rolls 18 as before described, will be effectually crushed between the said rolls and the plate 22.

Carried by the frame of the machine and disposed in a plane below that of the runners 20 are main runners 23. Connected to and extending upwardly from said main runners 23 are front and rear uprights 24 which are preferably adjustable as to length, in order that the reels 25 may be raised or lowered to accommodate the same to the plants that are to be cleared of potato bugs. The blades 26 of the reels 25 are in the form of brushes, and are composed of broom-corn or other suitable brush material. In consequence of this it will be manifest that the blades will be possessed of flexibility, and consequently said blades may be depended upon to effectually displace potato bugs from the plants without in any degree injuring the plants. The forward ends of the reel shafts 27 are journaled in bearings carried by the upper cross-bar 28 of the frame, and said shafts 27 are equipped with miter gears 29, intermeshed with miter gears 6 on the shaft 5, for the driving of the reels from the said shaft 5. At their rear ends the reel shafts 27 are journaled in a rear transverse bar 30 that is adjustable as to length, in order that the rear ends of the reels may be positioned at different distances apart as conditions require. At their forward ends the runners 20 merge into inwardly and upwardly extending portions 41 which are hinged together at 42, and are adapted at such point to be suitably connected with a whiffletree or analogous draft device.

Connected with and extending rearwardly from the frame of the machine are handles 50, designed to enable an operator to conveniently guide and manipulate the destroyer incidental to the use thereof.

In the practical operation of my improved destroyer, the reels 25 are rotated as the destroyer is moved forward, and consequently bugs on plants encountered by the blades of the reels will be dislodged and thrown to the deflector 17, the sides of which will guide the bugs downwardly on the rolls 18 so that the bugs will be caught between the said rolls and the resilient plates 22. In this way the bugs will be effectually crushed and after the crushing operation the remains of the bugs will be displaced from the plates 22 by the rolls 18, so that at all times the coöperating rolls 18 and plates 22 will be in condition to effectually destroy the bugs.

Having described my invention, what I claim and desire to secure by Letters-Patent, is:

1. In a potato bug destroyer, the combination of longitudinally disposed crushing rolls, a longitudinal deflector, of inverted V-shape in cross-section, disposed between said rolls and extending upwardly beyond the plane thereof, means held under yielding pressure against the under sides of the rolls for coöperating therewith in the crushing operation; and means for dislodging bugs from plants and delivering the same to the deflector.

2. In a potato bug destroyer, the combination of a crushing roll, means for guiding bugs to said roll, means for dislodging bugs from plants and delivering the same to said guiding means, and means held under yielding pressure flatwise and upwardly against the lower portion of the roll and extending tangentially outward from the same, for coöperation with the roll in the crushing operation.

3. In a potato bug destroyer, the combination of an inner longitudinal main runner, outer auxiliary runners spaced from the main runner, longitudinal crushing rolls disposed between the inner and outer runners, means connected with the outer runners and held under yielding pressure against the rolls for coöperation therewith in the crushing operation, a longitudinal deflector, of inverted V-shape in cross-section supported between the rolls and extending above the plane thereof, a ground wheel, driving connections between the same and the rolls, and means for deriving motion from the ground wheel for dislodging bugs from plants and delivering the bugs to the sides of the deflector.

4. In a potato bug destroyer, the combination of a frame, a deflector of inverted V-shape in cross-section carried by the frame and extending longitudinally thereof, a shaft carried by the forward portion of the frame, a ground wheel, vertically swinging means carrying the ground wheel and connected with and extending rearwardly from said shaft and provided with a rearwardly extending shank, and means whereby said shank may be detachably fastened to the upper portion of said deflector.

In testimony whereof I affix my signature.

ALBERT JULIEN.

Copies of this patent may be obtained for five cents each, by addressing the "Commissioner of Patents, Washington, D. C."